(12) United States Patent
Lee et al.

(10) Patent No.: US 9,245,689 B2
(45) Date of Patent: Jan. 26, 2016

(54) MULTILAYER CERAMIC ELECTRONIC COMPONENT AND METHOD OF MANUFACTURING THE SAME

(71) Applicant: SAMSUNG ELECTRO-MECHANICS CO., LTD., Suwon, Gyunggi-do (KR)

(72) Inventors: Seung Ho Lee, Gyunggi-do (KR); Jong Han Kim, Gyunggi-do (KR); Yoon Hee Lee, Gyunggi-do (KR); Min Gon Lee, Gyunggi-do (KR); Jae Man Park, Gyunggi-do (KR)

(73) Assignee: SAMSUNG ELECTRO-MECHANICS CO., LTD., Suwon, Gyunggi-Do (KR)

( * ) Notice: Subject to any disclaimer, the term of this patent is extended or adjusted under 35 U.S.C. 154(b) by 156 days.

(21) Appl. No.: 14/067,922

(22) Filed: Oct. 30, 2013

(65) Prior Publication Data
US 2015/0022944 A1   Jan. 22, 2015

(30) Foreign Application Priority Data
Jul. 22, 2013   (KR) .................. 10-2013-0086320

(51) Int. Cl.
*H01G 4/30* (2006.01)
*C04B 35/64* (2006.01)
*H01G 4/005* (2006.01)
*H01G 4/012* (2006.01)

(52) U.S. Cl.
CPC   *H01G 4/30* (2013.01); *C04B 35/64* (2013.01); *H01G 4/005* (2013.01); *H01G 4/012* (2013.01); *C04B 2235/6584* (2013.01); *C04B 2235/95* (2013.01)

(58) Field of Classification Search
USPC ............... 361/301.4, 301.2, 303–305, 306.1, 361/306.3, 321.1, 321.2
See application file for complete search history.

(56) References Cited

U.S. PATENT DOCUMENTS 5,016,137 A *   5/1991   Yokotani et al. ........... 361/321.4
6,320,738 B1 *   11/2001   Yamana et al. ............ 361/321.2

FOREIGN PATENT DOCUMENTS

JP   2000049039 A   2/2000
JP   2002-164248 A   6/2002

* cited by examiner

*Primary Examiner* — Nguyen T Ha
(74) *Attorney, Agent, or Firm* — McDermott Will & Emery LLP

(57) ABSTRACT

There is provided a multilayer ceramic electronic component including a ceramic body including dielectric layers, internal electrodes formed in the ceramic body and including pores, and first and second external electrodes formed on both end portions of the ceramic body, wherein in a cross section of the ceramic body in length and thickness directions, when a thickness of the internal electrode is to and a thickness of the pore is tp, 0.41≤tp/te≤0.86 is satisfied.

10 Claims, 2 Drawing Sheets

MULTILAYER CERAMIC ELECTRONIC COMPONENT AND METHOD OF MANUFACTURING THE SAME

CROSS-REFERENCE TO RELATED APPLICATION

This application claims the benefit of Korean Patent Application No. 10-2013-0086320 filed on Jul. 22, 2013, with the Korean Intellectual Property Office, the disclosure of which is incorporated herein by reference.

BACKGROUND OF THE INVENTION

1. Field of the Invention

The present invention relates to a multilayer ceramic electronic component and a method of manufacturing the same, and more particularly, to a high capacitance multilayer ceramic electronic component, and a method of manufacturing the same.

2. Description of the Related Art

Generally, electronic components using a ceramic material, such as capacitors, inductors, piezoelectric elements, varistors, thermistors, and the like, include a ceramic body formed of a ceramic material, internal electrode layers formed in the ceramic body, and external electrodes formed on surfaces of the ceramic body so as to be connected to the internal electrode layers.

Among the ceramic electronic components, a multilayer ceramic capacitor is configured to include a plurality of multilayer dielectric layers, internal electrode layers disposed to face each other, having the dielectric layer interposed therebetween, and external electrodes electrically connected to the internal electrode layers.

The multilayer ceramic capacitors have been widely used as components of computers, mobile communications devices such as personal digital assistants (PDAs), cellular phones, and the like, due to advantages such as a small size, high capacitance, ease of mounting, and the like.

Recently, in accordance with improvement in performance of electric or electronic devices and thinness and lightness of the electric or electronic devices, demand for small sized, high performance, and inexpensive electronic components have increased. Particularly, in accordance with an increase in a speed of a central processing unit (CPU), miniaturization and lightness, digitalization, and multi-functionalization of devices, research into and development of multilayer ceramic capacitors having features such as a small size, a thin thickness, a high capacitance, and a low impedance in a high frequency region, and the like, have been actively conducted.

Particularly, in accordance with thinness of an internal electrode, there is a problem in connectivity of the internal electrode, which causes reliability of the multilayer ceramic electronic component to be deteriorated.

In addition, in accordance with the thinness of the internal electrode, there is a problem in the connectivity of the internal electrode, such that it may be difficult to implement high capacitance multilayer ceramic electronic components.

RELATED ART DOCUMENT

Japanese Patent Laid-Open Publication No. 2002-164248

SUMMARY OF THE INVENTION

An aspect of the present invention provides a high capacitance multilayer ceramic electronic component and a method of manufacturing the same.

According to an aspect of the present invention, there is provided a multilayer ceramic electronic component including: a ceramic body including dielectric layers; internal electrodes formed in the ceramic body and including pores; and first and second external electrodes formed on both end portions of the ceramic body, wherein in a cross section of the ceramic body in length and thickness directions, when a thickness of the internal electrode is te and a thickness of the pore is tp, $0.41 \leq tp/te \leq 0.86$ is satisfied.

The thickness te of the internal electrode may satisfy $0.1\ \mu m \leq te \leq 0.8\ \mu m$.

When a ratio of a sum of lengths of actually formed internal electrode portions to an overall length of the internal electrode is defined as connectivity of the internal electrode, the connectivity of the internal electrode may be 85% or more.

The thickness tp of the pore may be represented by an average value of thicknesses of four regions formed when one pore is trisected in the length direction of the ceramic body.

The thickness tp of the pore may be represented by an average value of thicknesses of all of the pores.

The thickness te of the internal electrode may be an average thickness of the internal electrode.

According to another aspect of the present invention, there is provided a method of manufacturing a multilayer ceramic electronic component including: preparing a conductive paste including conductive metal powder particles and ceramic powder particles; forming internal electrodes on ceramic green sheets using the conductive paste; stacking the ceramic green sheets having the internal electrodes formed thereon; and compressing and sintering a multilayer body in which the ceramic green sheets are stacked to form a ceramic body including dielectric layers and the internal electrodes, wherein in a cross section of the ceramic body in length and thickness directions, when a thickness of the internal electrode is te and a thickness of the pore is tp, $0.41 \leq tp/te \leq 0.86$ is satisfied.

The thickness te of the internal electrode may satisfy $0.1\ \mu m \leq te \leq 0.8\ \mu m$.

When a sum of lengths of actually formed internal electrode portions to an overall length of the internal electrode is defined as connectivity of the internal electrode, the connectivity of the internal electrode may be 85% or more.

The thickness tp of the pore may be represented by an average value of thicknesses of four regions formed when one pore is trisected in the length direction of the ceramic body.

The thickness tp of the pore may be represented by an average value of thicknesses of all of the pores.

The thickness te of the internal electrode may be an average thickness of the internal electrode.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
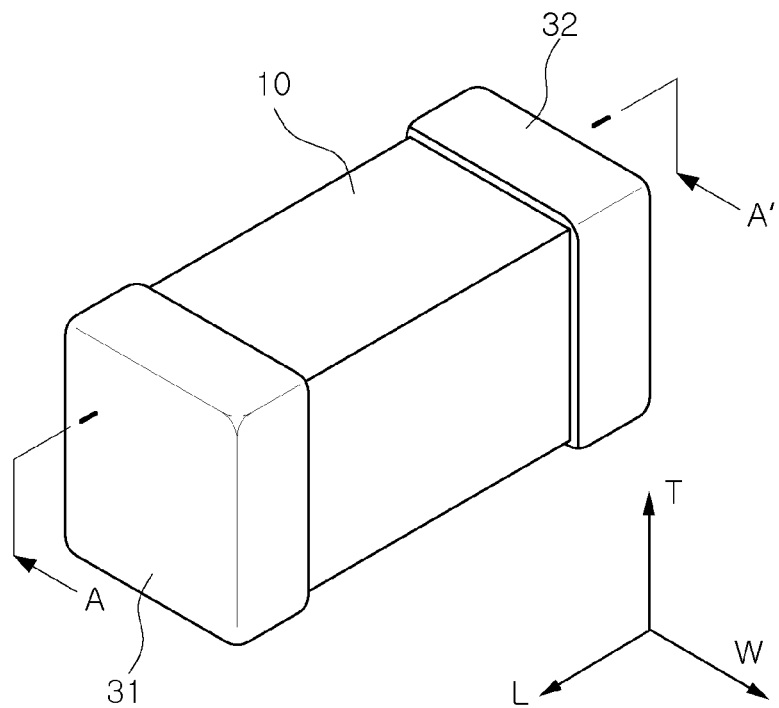
FIG. 1 is a perspective view schematically showing a multilayer ceramic capacitor according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

FIG. 1 is a perspective view schematically showing a multilayer ceramic capacitor according to an embodiment of the present invention.

Figure 2:
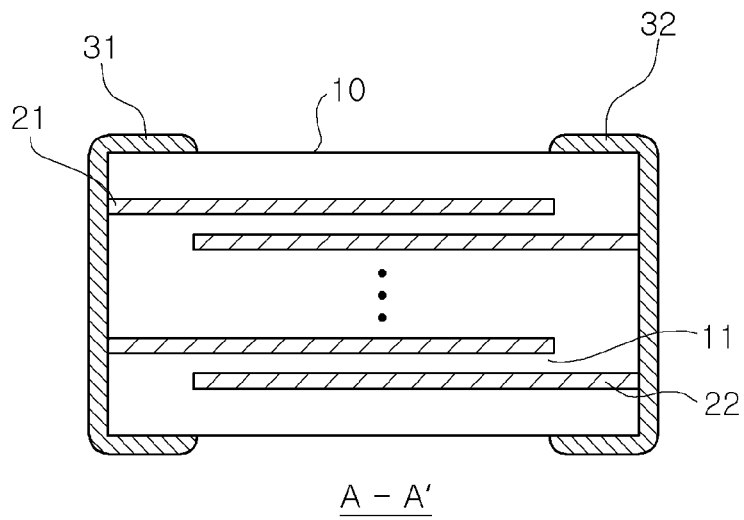
FIG. 2 is a cross-sectional view of line A-A' of FIG. 1.

FIG. 2 is a cross-sectional view of line A-A' of FIG. 1.

Figure 3:
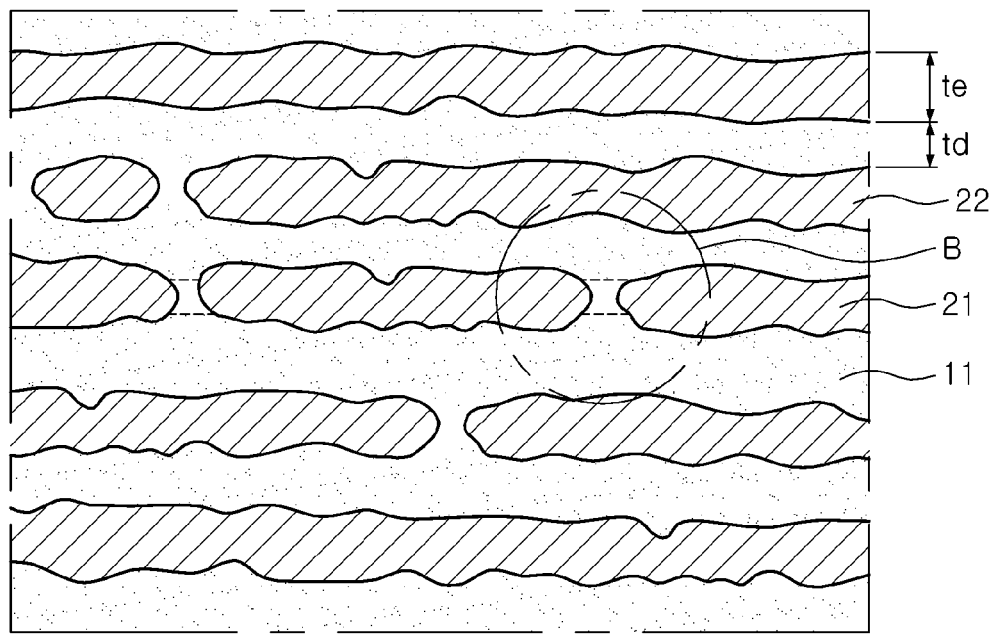
FIG. 3 is a partially enlarged view schematically showing a cross section of the multilayer ceramic capacitor according to the embodiment of the present invention.

FIG. 3 is a partially enlarged view schematically showing a cross section of the multilayer ceramic capacitor according to the embodiment of the present invention.

Figure 4:
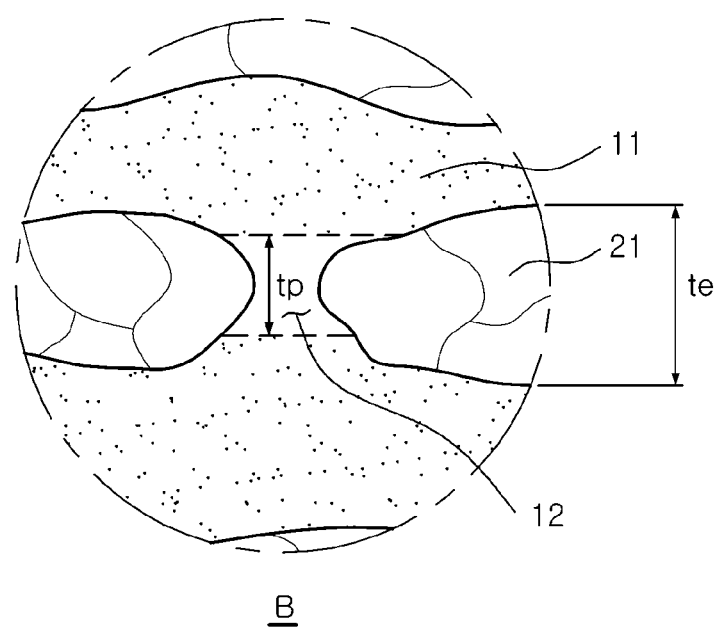
FIG. 4 is an enlarged view schematically showing region B of FIG. 3.

FIG. 4 is an enlarged view schematically showing region B of FIG. 3.

Referring to FIGS. 1 and 2, the multilayer ceramic electronic component according to the embodiment of the present invention may include a ceramic body 10, internal electrodes 21 and 22 formed in the ceramic body, and external electrodes 31 and 32 formed on outer surfaces of the ceramic body 10.

In the multilayer ceramic capacitor according to the embodiment of the present invention, a 'length direction' refers to an 'L' direction of FIG. 1, a 'width direction' refers to a 'W' direction of FIG. 1, and a 'thickness direction' refers to a 'T' direction of FIG. 1. Here, the 'thickness direction' is the same as a direction in which dielectric layers are stacked, that is, a 'stacking direction'.

According to the embodiment of the present invention, a shape of the ceramic body 10 is not particularly limited, but may be a hexahedral shape as shown in FIG. 1.

According to the embodiment of the present invention, the ceramic body 10 may have both main surfaces opposing each other, both side surfaces opposing each other, and both end surfaces opposing each other, wherein the both main surfaces may also be represented by upper and lower surfaces of the ceramic body 10, respectively.

The ceramic body 10 may include dielectric layers 11, which may include a high-k dielectric material.

Since the dielectric material includes an electric dipole, it may induce a relatively large amount of charges to be accumulated.

According to the embodiment of the present invention, a raw material forming the dielectric layer 11 is not particularly limited as long as a sufficient capacitance may be obtained. For example, the raw material forming the dielectric layer 11 may be a barium titanate ($BaTiO_3$) powder.

In a material forming the dielectric layer 11, various ceramic additives, organic solvents, plasticizers, binders, dispersing agents, and the like, may be added to a powder such as the barium titanate ($BaTiO_3$) powder, or the like, according to the embodiment of the present invention.

An average particle size of ceramic powder particles used to form the dielectric layer 11 is not particularly limited, but may be controlled in order to implement the embodiment of the present invention. For example, the average particle size may be controlled to be 400 nm or less.

The internal electrodes 21 and 22, a pair of electrodes having different polarities, may be formed by printing a conductive paste including a conductive metal on the dielectric layer 11 to a predetermined thickness.

In addition, the internal electrodes 21 and 22 may be alternately exposed to both end surfaces in a direction in which the dielectric layers 11 are stacked and may be electrically insulated from each other by the dielectric layer 11 interposed therebetween.

That is, the internal electrode may have first and second internal electrodes 21 and 22 and the first and second internal electrodes 21 and 22 may be electrically connected to the external electrodes 31 and 32 through portions thereof alternately exposed to both end surfaces of the ceramic body 10, respectively.

Therefore, when a voltage is applied to the external electrodes 31 and 32, charges may be accumulated between the first and second internal electrodes 21 and 22 facing each other. In this case, capacitance of the multilayer ceramic capacitor may be in proportion to an area of a region in which the first and second internal electrodes 21 and 22 are overlapped with each other.

In addition, the conductive metal included in the conductive paste forming the first and second internal electrodes 21 and 22 may be nickel (Ni), copper (Cu), palladium (Pd), or an alloy thereof. However, the present invention is not limited thereto.

In addition, as a method of printing the conductive paste, a screen printing method, a gravure printing method, or the like, may be used. However, the present invention is not limited thereto.

According to the embodiment of the present invention, when a thickness of the internal electrode 21 or 22 is referred to te, $0.1\ \mu m \leq te \leq 0.8\ \mu m$ may be satisfied.

The thickness te of the internal electrode 21 or 22 may be represented by an average value. The thickness te of the internal electrode 21 or 22 may be defined as an average value of values obtained by measuring thicknesses of the internal electrodes at ten equidistant points in a length direction in a cross section of the ceramic body 10 taken in length and thickness directions thereof (an L-T cross section) using a scanning electron microscope (SEM).

The thickness of the internal electrode 21 or 22 may be calculated as a ratio of an area of the internal electrode 21 or 22 to an actual length of the internal electrode 21 or 22 (area of internal electrode/actual length of internal electrode).

Referring to FIG. 3, the area of the internal electrode 21 or 22 may be an area including an electrode region, and the actual length of the internal electrode 21 or 22 may be a length except for pores 12 formed in a respective internal electrode.

The area of the internal electrode 21 or 22 and the actual length of the internal electrode 21 or 22 may be measured in one internal electrode layer and may be generalized with respect to the entire multilayer ceramic capacitor by multiplying the measured area and actual length by the number of stacked layers.

According to the embodiment of the present invention, the thickness to of the internal electrode 21 or 22 is controlled to satisfy $0.1\ \mu m \leq Te \leq 0.8\ \mu m$, and thus, even in the case in which the internal electrodes are thinned, a high capacitance multilayer ceramic electronic component having excellent reliability may be implemented.

In the case in which the thickness te of the internal electrode 21 or 22 is less than $0.1\ \mu m$, disconnectivity of the electrode may be intensified, such that a high capacitance multilayer ceramic capacitor may not be implemented, and in the case in which the thickness te of the internal electrode 21 or 22 exceeds $0.8\ \mu m$, the internal electrode of the multilayer ceramic capacitor may not be implemented as a thin film.

A method capable of implementing a high capacitance multilayer ceramic electronic component while satisfying the following condition for the thickness te of the internal electrode 21 or 22: 0.1 μm≤te≤0.8 μm will be described in detail below.

In addition, the internal electrodes 21 and 22 may include the pores 12 formed therein.

According to the embodiment of the present invention, the ceramic body 10 may include the external electrodes 31 and 32 formed on both end portions thereof.

The external electrodes 31 and 32 may be formed on end surfaces of the ceramic body 10 in the length direction ("L direction") thereof.

The external electrodes 31 and 32 may be extended to portions of upper and lower surfaces and side surfaces of the ceramic body 10.

The external electrode may have first and second external electrodes 31 and 32 and may have electricity applied thereto and having different polarities.

The external electrodes 31 and 32 may include a conductive metal and glass. The conductive metal may include at least one selected from a group consisting of gold, silver, palladium, copper, nickel, and an alloy thereof.

According to the embodiment of the present invention, in the cross section of the ceramic body 10 taken in length and thickness directions thereof (an L-T cross section), when a thickness of the internal electrode 21 or 22 refers to te and a thickness of the pore 12 is tp, 0.41≤tp/te≤0.86 may be satisfied.

Recently, in accordance with miniaturization and lightness of the multilayer ceramic capacitor, the internal electrode has been further thinned.

In order to form a relatively thin internal electrode, fine metal powder particles may be used. However, in this case, it may be difficult to control sintering contraction of the metal powder particles and it may be difficult to secure connectivity of the internal electrode.

Generally, the internal electrode may be formed of a conductive paste including conductive metal powder particles and ceramic powder particles.

In detail, the internal electrodes are formed on ceramic green sheets using the conductive paste, the ceramic green sheets having the internal electrodes formed thereon are stacked, and a multilayer body in which the ceramic green sheets are stacked is compressed and fired, whereby the ceramic body including the dielectric layers and the internal electrodes may be formed.

In this case, in a process of compressing and firing the multilayer body, a partial region of the internal electrode may be disconnected, such that a pore may be formed.

When the internal electrode is rapidly fired, the electrode may be aggregated or disconnected due to excessive firing of the internal electrode to form the pore, such that the connectivity of the internal electrode is deteriorated, whereby capacitance of the multilayer ceramic capacitor may be decreased.

In addition, a defect of an internal structure of the multilayer ceramic capacitor, such as cracking may be generated after the multilayer body is fired.

That is, the pore may be one of the causes of decreasing the capacitance of the multilayer ceramic capacitor. As a thickness of the pore is increased, the capacitance of the multilayer ceramic capacitor may be further decreased.

Referring to FIGS. 3 and 4, with the multilayer ceramic capacitor according to the embodiment of the present invention, in the cross section of the ceramic body 10 taken in length and thickness directions thereof (the L-T cross section), a ratio of the thickness tp of the pore 12 to the thickness to of the internal electrode 21 or 22 is controlled so as to satisfy 0.41≤tp/te≤0.86, whereby an effective capacitance of the multilayer ceramic capacitor may be increased.

That is, the thickness tp of the pore 12 may be decreased within a predetermined range to thus increase an effective area forming the capacitance as compared to existing multilayer ceramic capacitors having the same size, such that the capacitance may be increased.

The thickness tp of the pore 12 may be represented by an average value of thicknesses of four regions formed in the case in which one pore is trisected in the length direction of the ceramic body 10.

That is, it indicates that the thickness tp of the pore 12 may be obtained by measuring the thicknesses of the four regions formed in the case in which one pore is trisected in the length direction of the ceramic body 10 and calculating the average value of the thicknesses of the four regions.

The thickness tp of the pore 12 may be measured by scanning a cross section of the ceramic body 10 in the length direction using a scanning electron microscope (SEM) as shown in FIGS. 2 and 3.

For example, with respect to any internal electrode extracted from an image obtained by scanning the cross section of the ceramic body 10 in the length and thickness (L-T) directions taken in a central portion of the ceramic body 10 in the width (W) direction thereof using the scanning electron microscope (SEM) as shown in FIG. 2, one pore may be selected and a thickness of the selected pore may then be measured to obtain an average thickness.

That is, in the case in which the selected pore is virtually trisected in the length direction of the ceramic body, the selected pore may be divided into four regions.

A value obtained by calculating an average of values obtained by measuring thicknesses of the four regions may be used as the thickness tp of the pore 12.

In addition, the thickness tp of the pore 12 may be represented by an average value of the thicknesses of all of the pores.

That is, the average value of the thicknesses of all of the pores measured by applying the method of measuring the thickness of the pore as the average value of the thicknesses of the four regions divided from one pore as described above to all of the pores may also be used as the thickness tp of the pore 12.

In the case in which the ratio (tp/te) of the thickness tp of the pore 12 to the thickness to of the internal electrode 21 or 22 is less than 0.41, the thickness tp of the pore 12 is excessively thin, such that a short-circuit defect may be generated.

In the case in which the ratio (tp/te) of the thickness tp of the pore 12 to the thickness to of the internal electrode 21 or 22 exceeds 0.86, the thickness tp of the pore 12 is excessively thick, such that an increase effect in an effective capacitance may not be generated.

Meanwhile, according to the embodiment of the present invention, when a ratio of a sum of lengths of actually formed internal electrode portions to an overall length of the internal electrode 21 or 22 is defined as connectivity of the internal electrode, the connectivity of the internal electrode 21 or 22 may be 85% or more.

The connectivity of the internal electrodes 21 and 22 may be defined as follows.

The internal electrodes 21 and 22 formed in the multilayer ceramic capacitor generally have a disconnected region formed therein, such that they are not be completely connected.

Since the internal electrodes 21 and 22 are formed by printing a conductive paste including conductive metal powder particles such as nickel (Ni) powder particles, or the like, on one surface of the ceramic green sheet, empty spaces may be present in the internal electrodes 21 and 22.

Therefore, in a cross section of the multilayer ceramic capacitor taken in a predetermined direction on an image thereof captured using the SEM, the internal electrodes 21 and 22 are not completely connected, but may include the pores 12 present therein.

When a length of the internal electrode 21 or 22 including the pores 12 is A and the sum of lengths of portions of the internal electrode except for the pores 12 is B, the connectivity S of the internal electrode may be defined as B/A.

The overall length of the internal electrode 21 or 22, and the lengths of actually formed internal electrode 21 or 22 portions, that is, the sum of lengths of portions of the internal electrode except for the pores 12, may be measured by an optical image obtained by scanning a cross section of the multilayer ceramic capacitor.

In more detail, in an image obtained by scanning a cross section of the ceramic body in the length direction, taken along a central portion of the ceramic body in the width direction, a ratio of the sum of lengths of actually formed internal electrode portions to an overall length of the internal electrode may be measured.

A relationship between a change in the capacitance and the possibility that cracking will occur due to thermal impact, depending on the connectivity of the internal electrode, will be described below.

In the case in which the connectivity of the internal electrode is high, the internal electrode is formed without having substantially a disconnected part therein, such that a relatively large capacitance may be secured as compared with the case in which the connectivity of the internal electrode is relatively low.

However, due to a step caused by a difference in thermal expansion coefficients between a material (for example, a metal such as nickel (Ni), or the like) forming the internal electrode and a ceramic, in the case in which thermal impact is applied to the multilayer ceramic capacitor, cracking or an insulation breakdown phenomenon may be easily generated.

On the other hand, in the case in which the connectivity of the internal electrode is relatively low, it may be difficult to secure the capacitance; however, the step caused by the difference in the thermal expansion coefficients between the material forming the internal electrode and the ceramic may be alleviated, such that the cracking and the insulation breakdown phenomenon due to the thermal impact may be prevented.

Therefore, in order to secure a stable capacitance and prevent the cracking and the insulation breakdown phenomenon due to the thermal impact, the connectivity of the internal electrode may be controlled to be an appropriate value.

In addition, the ceramic powder particles included, together with the conductive metal, in the internal electrode may generate an effect of delaying contraction of the internal electrode at the time of being fired, which has a significant effect on the connectivity of the internal electrode to have a relationship with the capacitance of the multilayer ceramic capacitor.

A method of controlling the connectivity of the internal electrode as described above is not particularly limited. For example, a method of controlling a particle size of the ceramic powder included in the conductive paste forming the internal electrode or, a method of controlling a firing temperature, or the like, may be used, and a detailed description thereof will be provided below.

The connectivity of the internal electrode 21 or 22 may be controlled to be 85% or more to improve capacitance, whereby a high capacitance multilayer ceramic capacitor may be implemented.

In the case in which the connectivity of the internal electrode is relatively large, the internal electrode is formed without having substantially an empty space therein, such that a large capacitance may be secured.

On the other hand, in the case in which the connectivity of the internal electrode is relatively small, an effective surface forming the capacitance may be decreased, and thus, it may be difficult to secure the capacitance.

In the case in which the connectivity of the internal electrode 21 or 22 is less than 85%, the effective surface forming the capacitance may be decreased, such that a target capacitance may not be implemented.

According to the embodiment of the present invention, when a thickness of the dielectric layer 11 refers to td, td≤1.0 μm may be satisfied.

The thickness td of the dielectric layer may indicate an average thickness of the dielectric layers.

According to the embodiment of the present invention, the average thickness of the dielectric layers 11 may indicate an average thickness of the dielectric layers 11 disposed between the internal electrodes 21 and 22.

The average thickness of the dielectric layers 11 may be measured by scanning a cross section of the ceramic body 10 in the length direction using a scanning electron microscope (SEM) as shown in FIG. 2.

For example, with respect to any dielectric layer extracted from an image obtained by scanning the cross section of the ceramic body 10 in the length and thickness (L-T) directions, taken in a central portion of the ceramic body 10 in the width (W) direction thereof using the scanning electron microscope (SEM) as shown in FIG. 2, thicknesses of the dielectric layer may be measured at equidistant thirty points in the length direction to measure an average value thereof.

The thicknesses of the dielectric layer at the equidistant thirty points may be measured in a capacitance forming part formed in a region in which the internal electrodes 21 and 22 are overlapped with each other.

In addition, when an average thickness of ten or more dielectric layers is measured, the average thickness of the dielectric layers may be further generalized.

A method of manufacturing a multilayer ceramic electronic component according to another embodiment of the present invention may include preparing a conductive paste including conductive metal powder particles and ceramic powder particles; forming internal electrodes on ceramic green sheets using the conductive paste; stacking the ceramic green sheets having the internal electrodes formed thereon; and compressing and sintering a multilayer body in which the ceramic green sheets are stacked to form a ceramic body including dielectric layers and the internal electrodes, wherein in a cross section of the ceramic body in length and thickness directions, when a thickness of the internal electrode is to and a thickness of the pore is tp, $0.41 \leq tp/te \leq 0.86$ may be satisfied.

First, conductive metal powder particles for imparting conductivity to the external electrodes 31 and 32, glass powder particles for densifying the external electrodes 31 and 32, ethanol as an organic solvent, polyvinyl butyral as a binder, and the like, may be mixed with each other and be then ball-milled to prepare pastes for an external electrode.

A conductive paste component forming the internal electrodes 21 and 22 may further include a binder, a solvent, other additives, and the like.

The binder may be polyvinyl butyral, a cellulose-based resin, or the like, but is not limited thereto. The polyvinyl butyral may have a relatively strong adhesion feature to improve adhesion strength between a conductive paste and ceramic green sheets.

The cellulose-based resin having a chair shaped structure may have a feature that it is rapidly restored by elasticity in the case in which it is deformed. The cellulose-based resin is used, whereby a flat printing surface may be secured.

The solvent is not particularly limited, but may be, for example, a butylcarbitol-based solvent, a kerosene-based solvent, a terpineol-based solvent, or the like. A detailed type of the terpineol-based solvent may be dehydro terpineol, dehydroterpinylacetate, or the like, but is not limited thereto.

Next, the conductive paste including the conductive metal powder particles and the ceramic powder particles may be prepared.

The ceramic powder particles have particle sizes smaller than those of the metal powder particles, such that they may be distributed between the metal powder particles.

Then, the internal electrodes 21 and 22 may be formed on the ceramic green sheets using the conductive paste.

The conductive paste may be formed on the ceramic green sheet using a method such as a screen printing method, or the like.

Next, the ceramic green sheets having the internal electrodes 21 and 22 formed thereon are stacked to prepare the multilayer body, and the multilayer body in which the ceramic green sheets are stacked is compressed and sintered to manufacture a sintered chip, and the external electrodes 31 and 32 are formed on outer surfaces of the sintered chip, whereby the multilayer ceramic electronic component may be completed.

In the case in which a base metal is used as a material of the internal electrodes 21 and 22, since the internal electrodes 21 and 22 may be oxidized when firing is performed in the air atmosphere, the firing may be performed under a reducing atmosphere.

In addition, in the compressing of the multilayer body, compression strength may be controlled to increase contraction force of the multilayer body in the thickness direction, whereby a thickness of the pore formed in the internal electrode may be decreased.

In addition, a nickel plating layer and a tin plating layer may be formed on the external electrodes 31 and 32 in order to facilitate the mounting.

A description of the same features as those of the multilayer ceramic electronic component according to the foregoing embodiment of the present invention will be omitted in order to avoid an overlapped description.

Hereinafter, the present invention will be described in detail with reference to Inventive Example and Comparative Example.

A multilayer ceramic capacitor according to Inventive Example and a multilayer ceramic capacitor according to Comparative Example were prepared by the following method.

Barium titanate powder particles, ethanol provided as an organic solvent, and polyvinyl butyral provided as a binder were mixed with each other and were ball-milled to prepare slurry. Then, a ceramic green sheet was manufactured using the slurry.

A conductive paste for an internal electrode containing nickel was printed on the ceramic green sheets to form the internal electrodes, and a multilayer body in which the ceramic green sheets are stacked was isostatically pressed at a temperature of 85° C. and at a pressure of 1,200 kgf/cm$^2$.

The pressed green multilayer body was cut to manufacture a green chip, a de-binder process in which the cut green ship is maintained at a temperature of 230° C. under an air atmospheric for sixty hours was performed, and the green chip was sintered at a temperature of 1000° C. to manufacture a sintered chip. The sintering was performed under a reducing atmosphere to prevent oxidation of the internal electrode, and the reducing atmosphere was $10^{-11}$ to $10^{-10}$ atm lower than Ni/NiO equilibrium oxygen partial pressure.

External electrodes were formed on outer portions of the sintered chip using a paste for an external electrode including copper powder particles and glass powder particles, and a nickel plating layer and a tin plating layer were formed on the external electrode by electroplating.

A multilayer ceramic capacitor having a 0603 size was manufactured by the above-mentioned method. The 0603 size may have a length and a width of 0.6 μm±0.1 μm and 0.3 μm±0.1 μm, respectively. Features of the multilayer ceramic capacitor were evaluated as follows.

The following Table 1 is a table illustrating comparison of capacitance features and a short-circuit defect feature depending on a ratio (tp/te) of a thickness tp of a pore to a thickness to of an internal electrode.

It has been determined that the capacitance feature is excellent (⊚) in the case in which it exceeds 90% of a design capacitance target value, is good (○) in the case in which it is in the range of 80 to 90% of the design capacitance target value, and is bad (X) in the case in which it is less than 80% of the design capacitance target value.

It has been determined that the short-circuit defect reduction feature is excellent (⊚) in the case in which a defective rate is less than 0.01%, is good (○) in the case in which the defective rate is in the range of 0.01 to 10%, and is bad (X) in the case in which a defective rate exceeds 10%.

TABLE 1

| Sample No. | tp/te | Capacitance | Short-circuit |
|---|---|---|---|
| 1* | 0.99 | X | ⊚ |
| 2* | 0.93 | X | ⊚ |
| 3* | 0.88 | X | ⊚ |
| 4 | 0.86 | ○ | ⊚ |
| 5 | 0.80 | ○ | ⊚ |
| 6 | 0.76 | ○ | ○ |
| 7 | 0.73 | ○ | ○ |
| 8 | 0.69 | ○ | ○ |
| 9 | 0.62 | ○ | ○ |
| 10 | 0.54 | ○ | ○ |
| 11 | 0.50 | ⊚ | ○ |
| 12 | 0.46 | ⊚ | ○ |
| 13 | 0.41 | ⊚ | ○ |
| 14* | 0.36 | ⊚ | X |
| 15* | 0.28 | ⊚ | X |

*Comparative Example

Referring to FIG. 1, it could be appreciated that in Sample Nos. 1 to 3 according to Comparative Example corresponding to the case in which the ratio (tp/te) of the thickness tp of the pore to the thickness to of the internal electrode exceeds 0.86, an increase effect of an effective capacitance was not generated.

In addition, it could be appreciated that in Sample Nos. 14 and 15 according to Comparative Example corresponding to the case in which the ratio (tp/te) of the thickness tp of the pore to the thickness te of the internal electrode is less than 0.41, a short-circuit defect was generated.

On the other hand, it could be appreciated that in Sample Nos. 4 to 13 according to Inventive Example corresponding to the case in which the ratio (tp/te) of the thickness tp of the pore to the thickness te of the internal electrode satisfies a numerical range according to the embodiment of the present invention, a short-circuit defect was not generated and a design capacitance was implemented, such that a high capacitance multilayer ceramic capacitor having excellent reliability may be implemented.

As set forth above, according to the embodiment of the present invention, the contraction force of the ceramic body in the thickness direction may be controlled at the time of forming the ceramic body to decrease the thickness of the pore in the internal electrode, whereby effective capacitance of the multilayer ceramic capacitor may be increased.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component comprising:
a ceramic body including dielectric layers;
internal electrodes formed in the ceramic body and including pores; and
first and second external electrodes formed on both end portions of the ceramic body,
wherein in a cross section of the ceramic body in length and thickness directions, when a thickness of the internal electrode is te and a thickness of the pore is tp, $0.41 \leq tp/te \leq 0.86$ is satisfied, and
when a ratio of a sum of lengths of actually formed internal electrode portions to an overall length of the internal electrode is defined as connectivity of the internal electrode, the connectivity of the internal electrode is 85% or more.

2. The multilayer ceramic electronic component of claim 1, wherein the thickness te of the internal electrode satisfies $0.1 \mu m \leq te \leq 0.8 \mu m$.

3. The multilayer ceramic electronic component of claim 1, wherein the thickness tp of the pore is represented by an average value of thicknesses of four regions formed when one pore is trisected in the length direction of the ceramic body.

4. The multilayer ceramic electronic component of claim 3, wherein the thickness tp of the pore is represented by an average value of thicknesses of all of the pores.

5. The multilayer ceramic electronic component of claim 1, wherein the thickness te of the internal electrode is an average thickness of the internal electrode.

6. A method of manufacturing a multilayer ceramic electronic component comprising:
preparing a conductive paste including conductive metal powder particles and ceramic powder particles;
forming internal electrodes on ceramic green sheets using the conductive paste;
stacking the ceramic green sheets having the internal electrodes formed thereon; and
compressing and sintering a multilayer body in which the ceramic green sheets are stacked to thereby form a ceramic body including dielectric layers and the internal electrodes,
wherein in a cross section of the ceramic body in length and thickness directions, when a thickness of the internal electrode is te and a thickness of the pore is tp, $0.41 \leq tp/te \leq 0.86$ is satisfied, and
when a ratio of a sum of lengths of actually formed internal electrode portions to an overall length of the internal electrode is defined as connectivity of the internal electrode, the connectivity of the internal electrode is 85% or more.

7. The method of claim 6, wherein the thickness te of the internal electrode satisfies $0.1 \mu m \leq te \leq 0.8 \mu m$.

8. The method of claim 6, wherein the thickness tp of the pore is represented by an average value of thicknesses of four regions formed when one pore is trisected in the length direction of the ceramic body.

9. The method of claim 8, wherein the thickness tp of the pore is represented by an average value of thicknesses of all of the pores.

10. The method of claim 6, wherein the thickness to of the internal electrode is an average thickness of the internal electrode.

* * * * *